(12) United States Patent
Sanada et al.

(10) Patent No.: US 7,976,146 B2
(45) Date of Patent: Jul. 12, 2011

(54) INK JET RECORDING INK TANK

(75) Inventors: Mikio Sanada, Kawasaki (JP); Kenji Moribe, Fujisawa (JP); Satomi Yanagimachi, Yokosuka (JP); Kouhei Nakagawa, Kawasaki (JP); Yasuhito Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 734 days.

(21) Appl. No.: 12/101,910

(22) Filed: Apr. 11, 2008

(65) Prior Publication Data
US 2008/0278552 A1     Nov. 13, 2008

(30) Foreign Application Priority Data
May 11, 2007   (JP) ................................. 2007-126894

(51) Int. Cl.
*G01D 11/00* (2006.01)
(52) U.S. Cl. .......................................... 347/100; 347/86
(58) Field of Classification Search .............. 347/84–91, 347/100; 106/31.13
See application file for complete search history.

(56) References Cited

U.S. PATENT DOCUMENTS

| | | | |
|---|---|---|---|
| 5,509,140 A | 4/1996 | Koitabashi et al. | 347/86 |
| 5,972,082 A | 10/1999 | Koyano et al. | 106/31.27 |
| 6,120,130 A * | 9/2000 | Hirano et al. | 347/46 |
| 6,692,115 B2 | 2/2004 | Sanada et al. | 347/85 |
| 6,709,092 B2 | 3/2004 | Hayashi et al. | 347/86 |
| 6,796,645 B2 | 9/2004 | Hayashi et al. | 347/86 |
| 6,815,381 B1 | 11/2004 | Yamamoto et al. | 442/187 |
| 6,863,762 B2 | 3/2005 | Sanada et al. | 156/180 |
| 7,037,362 B2 * | 5/2006 | Honma et al. | 106/31.13 |
| 7,066,590 B2 * | 6/2006 | Lee et al. | 347/100 |
| 7,141,107 B2 * | 11/2006 | Honma et al. | 106/31.58 |
| 7,682,433 B2 * | 3/2010 | Yanagimachi et al. | 106/31.6 |
| 7,699,924 B2 * | 4/2010 | Mafune et al. | 106/31.89 |
| 7,708,397 B2 * | 5/2010 | Satoh | 347/100 |
| 7,862,653 B2 * | 1/2011 | Sanada et al. | 106/31.27 |
| 7,866,805 B2 * | 1/2011 | Furukawa | 347/95 |
| 2004/0069183 A1 | 4/2004 | Kamoto et al. | 106/31.27 |
| 2004/0103815 A1 | 6/2004 | Honma et al. | 106/31.13 |
| 2006/0055762 A1 * | 3/2006 | Ushiku et al. | 347/105 |
| 2007/0247496 A1 * | 10/2007 | Sekiguchi | 347/84 |
| 2007/0252881 A1 * | 11/2007 | Sanada et al. | 347/100 |

(Continued)

FOREIGN PATENT DOCUMENTS
JP       2003-128970       5/2003

(Continued)

OTHER PUBLICATIONS

M.J. Rosen, X.Y. Hua, "Dynamic Surface Tension of Aqueous Surfactant Solutions", Jounal of Colloid and Interface Science, vol. 139, No. 2, Oct. 15, 1990.*

(Continued)

*Primary Examiner* — Charlie Peng
(74) *Attorney, Agent, or Firm* — Fitzpatrick, Cella, Harper & Scinto

(57) ABSTRACT

An ink jet recording ink tank includes: an ink retention member, which to hold ink exerts a negative pressure through capillary force; and ink, which is retained in the ink retention member, for which a dynamic surface tension in a lifetime of 50 msec, obtained by a maximum bubble pressure method, is higher than an interfacial tension of the ink retention member, a dynamic surface tension in a lifetime of 5000 msec is lower than the interfacial tension of the ink retention member, and a difference between the dynamic surface tension in the lifetime of 50 msec and the dynamic surface tension in the lifetime of 5000 msec is equal to or greater than 8 mN/m.

7 Claims, 8 Drawing Sheets

U.S. PATENT DOCUMENTS

| | | | |
|---|---|---|---|
| 2008/0018722 A1* | 1/2008 | Mafune et al. | 347/100 |
| 2008/0186359 A1* | 8/2008 | Ito | 347/54 |
| 2008/0280041 A1* | 11/2008 | Nishino et al. | 427/256 |
| 2008/0280042 A1* | 11/2008 | Yanagimachi et al. | 427/256 |
| 2008/0280043 A1* | 11/2008 | Moribe et al. | 427/256 |
| 2008/0280044 A1* | 11/2008 | Okamura et al. | 427/258 |
| 2009/0035467 A1* | 2/2009 | Sekiguchi et al. | 427/256 |
| 2010/0225707 A1* | 9/2010 | Kudo et al. | 347/56 |

FOREIGN PATENT DOCUMENTS

| | | |
|---|---|---|
| JP | 2004-051800 | 2/2004 |
| JP | 2004-115708 | 4/2004 |
| WO | 2006/046418 | 5/2006 |

OTHER PUBLICATIONS

B. Zhmud, "Dynamic Aspects of Ink-Paper Interaction in Relation to Inkjet Printing", Pira Internaional conference, Ink on Paper, Jan. 14 & 15, 2003, Brussels, Belgium.*

V.B. Fainerman, B.D. Mys, A.V. Makievski, R. Miller, "Application of the maximum bubble pressure technique for dynamic surface tension studies of surfactant solutions using the Sugden two-capillary method", Journal of Colloid and Interface Science 304(2006) 222-225.*

European Office Action dated Aug. 13, 2010, from corresponding European Application No. 08154953.7.

* cited by examiner

INK JET RECORDING INK TANK

BACKGROUND OF THE INVENTION

1. Field of the Invention

The present invention relates to an ink jet recording ink tank, employed for an ink jet recording apparatus that performs a recording operation by discharging a liquid, such as ink.

2. Description of the Related Art

Conventionally, ink tanks, employed to supply ink to the recording heads of apparatuses to record data on a variety of print media and other materials, can roughly be categorized as being one of two types, depending on the ink storage method used.

The first type is one wherein an ink tank, in which ink is stored, is incorporated within the main body of an apparatus, and a tube, for example, is employed as an ink supply path leading from the ink tank to a recording head.

The second type is one that employs an ink absorbent member, arranged so as to cover an entire ink tank, and that uses capillary force to draw in and retain ink, and the capillary force is balanced between the ink absorbent member and an ink discharge port in a recording head to maintain a meniscus at the ink discharge hole. According to this absorbent member ink tank type, the amount of ink held is smaller than the maximum capacity of the ink absorbent member, so that a gas-liquid interface is generated, between the ink and the air in the ink absorbent member, near an atmosphere communication hole, where there is no ink. Through capillary force at the gas-liquid interface, ink is retained within the ink absorbent member. Another ink tank that employs an ink absorbent member is a partitioned ink chamber type. As a well known ink tank that employs this method, there is one wherein a negative pressure generating member storage portion, where a negative pressure generating member is stored, and an ink holder, adjacent to the pressure generating member storage portion for storing ink, are connected by a communication path, and another path, for introducing air, is formed that is extended into the vicinity of the communication path (see U.S. Pat. No. 5,509,140).

Furthermore, focusing now on the dynamic surface tension of ink, a method according to which, for the stable discharge of ink, the dynamic surface tension between a discharge port and an ink chamber is balanced (see U.S. Publication No. 2004/0069183). What draws attention in this proposal is a relationship between a dynamic surface tension of 10 Hz, which corresponds to the rapid migration state of ink that is discharged from a discharge port, and the dynamic surface tension of 1 Hz in the slow migration state of ink, which corresponds to the amount of ink supplied through the discharge port of the ink chamber. According to this proposal, a difference between the dynamic surface tension of ink in the rapid migration state and the dynamic surface tension in the slow migration state is set equal to or smaller than 7 mN/m. By adjusting the dynamic surface tension difference, the dynamic surface tension having a high frequency at the discharge port and the dynamic surface tension having a low frequency in the ink chamber are balanced, in order to discharge ink stably. When these dynamic surface tensions are balanced, the stable discharge of ink droplets should be obtained.

There is another proposal related to ink for which a drying viscosity is 100 mPa·s or less, the dynamic surface tension for a lifetime of 10 msec is 45 mN/m or higher, and the dynamic surface tension for a lifetime of 1000 msec is 35 mN/m or lower (see U.S. Pat. No. 7,037,362).

Generally, ink employed for ink jet recording is designed in accordance with a requested recording characteristic or a fixing characteristic relative to a recording medium. Further, a capillary characteristic for determining an ink supply characteristic relative to the recording head of an ink tank and an ink retaining property during physical distribution are designated for an ink tank that includes an ink retention member, such as an ink absorbent member. One of the matters to be considered for an ink tank, such as the one described above, is a relationship between the amount of ink available for use in the ink tank (the amount of residual ink) and a static negative pressure. FIG. 1 is a graph illustrating a general transition of a relationship between the amount of ink available for use and a static negative pressure. It should be noted that "ink exhausted" in FIG. 1 represents a condition wherein no more ink is available for supply to a recording head. Based on the relationship, the affect the static surface tension of ink has on the characteristic of the ink tank can be studied.

First, ink having a low static surface tension provides a great permeation effect relative to the ink retention member. Therefore, the entire static negative pressure movement shown in FIG. 1 is shifted downward, as shown by arrow "H", and a period is extended until a static negative pressure PB is reached, at which time the condition is "ink exhausted". That is, a large amount of ink can be consumed before "ink exhausted", and the use efficiency of ink before "ink exhausted" tends to be improved. However, the initial static negative pressure PE is lowered, and since a reduction in the initial static negative pressure (PE) tends to impart energy to the movement of ink occasioned by vibrations or a pressure reduction during physical distribution, a problem, such as a leakage of ink, may occur. On the other hand, ink having a high static surface tension provides a low permeation effect relative to an ink retention member. Therefore, overall, the static negative pressure movement illustrated in FIG. 1 is shifted upward, as shown by arrow "I", and the initial static negative pressure PE is raised. Since an increase in the negative pressure PE inhibits the movement of ink occasioned by vibrations or the like during physical distribution, at the time of distribution, reliability tends to be increased. However, a period before the static negative pressure PE is reached, and at which "ink exhausted" occurs, is short, and the amount of ink used before "ink exhausted" tends to be reduced. That is, the efficiency with which ink is used before "ink exhausted" also tends to be reduced. Therefore, conventionally, the structure of the ink tank and the material and the form of the ink retention member are taken into consideration, and a balance is obtained between reliability, to counter shocks that occur during physical distribution, and efficiency, in the use of ink until "ink exhausted".

Furthermore, for an ink tank that is integrally formed with an ink jet recording head, in addition to the above mentioned problems related to the reliability of the physical distribution process and the use efficiency of ink until "ink exhausted", another problem encountered is related to coping with shocks caused by an ink jet head being mounted on an ink jet recording apparatus. That is, since ink in the ink retention member is moved when a shock occurs, a resulting phenomenon is that ink present at the discharge port of the recording head is drawn in toward the tank. The ink that was drawn in may be returned using a suction mechanism provided for the apparatus.

The problems related to acquisition of reliability during physical distribution and to efficient use of ink have been described for an ink tank integrally formed with an ink jet recording head, and for an ink tank provided as an individual item. In addition, the following problem is not yet fully understood, and a resolution method therefor has, as yet, not been proposed. That is, the problem is associated with an improvement in an injection property of ink that is injected into an ink tank, and the distribution state of the ink that has been so injected. This problem will now be described. A conventional ink tank shortcoming is one that becomes apparent during the injection of ink into an ink tank, in consonance with the static surface tension of ink. Since for ink having a low static surface tension a high permeation effect is provided, ink injection can be performed and completed in only a short period of time. However, because of the high permeation effect, ink permeates along the shape of an ink retention member, and in accordance with variances in the internal structure. As a result, after the ink retention member has been filled, the condition of the ink at certain locations within the ink retention member may differ. On the other hand, for ink having a high static surface tension, since the surface tension of the ink is usually higher than the interfacial tension of the ink retention member, and since relative to the ink retention member the ink permeation effect provided is low, a satisfactory amount of ink can not be acquired to fill the ink retention member.

SUMMARY OF THE INVENTION

A first problem to be solved by the present invention is how to focus on a relationship between a negative pressure generating member of an ink tank and the physical property of ink to provide an innovative ink tank, one which can both reliably counter shocks during physical distribution and ensure that ink will continue to be efficiently used until the supply is exhausted.

According to the present invention, in order to resolve the above described ink tank problems by employing the interfacial tension of an ink absorbent member and the physical property of ink, the migration of ink was analyzed, for the above described individual environments, by focusing on the dynamic surface tension of ink and the correlation between the dynamic surface tension and the absorption characteristic of an ink retention member. And the following view was obtained as to ink having a change in dynamic surface tension. That is, when the surface tension is high for dynamic movement during the initial displacement, ink in the ink retention member, especially at the gas-liquid interface, tends to be difficult to move, and effects are generated that suppress the leakage of ink while countering the effects of shock. On the other hand, the displacement of ink while filling the ink tank and while supplying ink from the ink tank to the recording head is a steady displacement that continues for a comparatively extended period of time, compared with the initial displacement, which occurs within a very short period of time. When during the steady displacement period the dynamic surface tension is low, the filling of the ink retention member, the permeability relative to the ink retention member and the supply of ink to the recording head are satisfactory. And since shock that occurs during physical distribution, or upon the mounting of the recording head in a recording apparatus, corresponds to the initial displacement, when ink having a dynamic surface tension change property that can proportionally cope with both initial displacement and steady displacement is employed, solutions for the above described problems can be achieved. As a result, the degree of freedom available, in the design of the structure and the shape of the ink tank and in the selection of a material to be used for the ink retention member, is also increased. The present invention is provided based on the above described view.

A first aspect of the present invention especially resolves the first problem, and provides an ink jet recording ink tank comprising: an ink retention member, which to hold ink exerts a negative pressure through capillary force; and ink, which is retained in the ink retention member, for which a dynamic surface tension in a lifetime of 50 msec, obtained by a maximum bubble pressure method, is higher than an interfacial tension of the ink retention member, a dynamic surface tension in a lifetime of 5000 msec is lower than the interfacial tension of the ink retention member, and a difference between the dynamic surface tension in the lifetime of 50 msec and the dynamic surface tension in the lifetime of 5000 msec is equal to or greater than 8 mN/m.

By the present invention, an ink tank which can both reliably counter shocks during physical distribution and ensure that ink will continue to be efficiently used until the supply is exhausted is provided, in view of a relationship between a negative pressure generating member of an ink tank and the physical property of ink.

Further features of the present invention will become apparent from the following description of exemplary embodiments with reference to the attached drawings.

DESCRIPTION OF THE EMBODIMENTS

Figure 1:
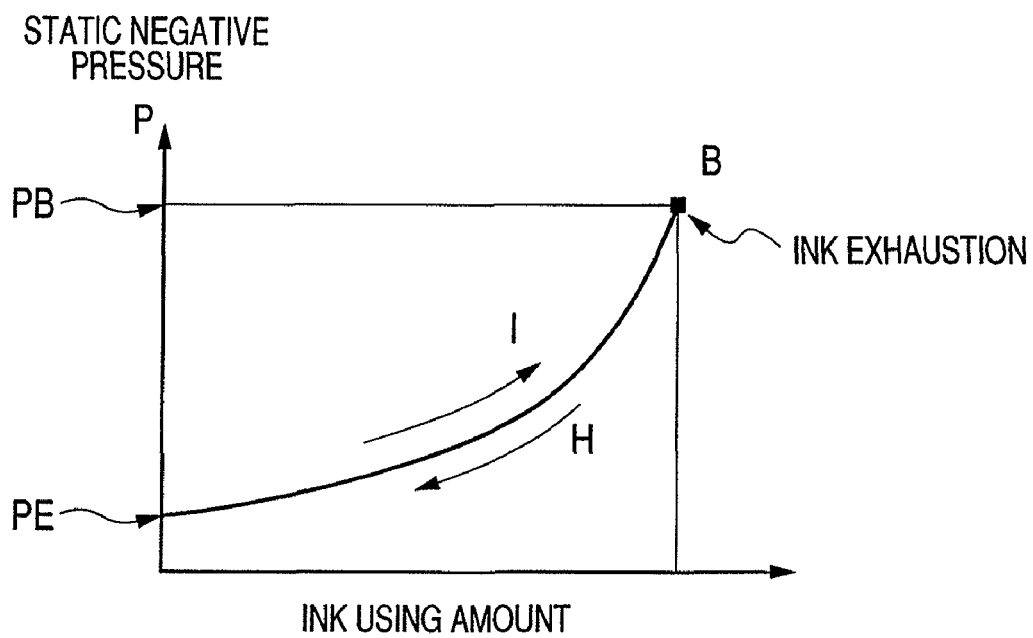
FIG. 1 is a graph showing a general relationship between a static negative pressure and the amount of ink, stored in an ink tank, that has been used.

Preferred embodiments of the present invention will now be described in detail in accordance with the accompanying drawings.

According to U.S. Pat. No. 7,037,362, as previously described, dynamic surface tensions are selected in order to obtain a balanced performance for the discharge of ink from a recording head and the supply of ink to a discharge port. Therefore, in U.S. Pat. No. 7,037,362, nothing is disclosed or taught concerning the importance of dynamic surface tension in the design of an ink tank based on the dynamic migration of ink. Further, even while taking into account various properties for a recording side, such as the ink discharge property of a recording head and a fixing property relative to a recording medium, an understanding can not be obtained, from the description given for U.S. Pat. No. 7,037,362, that the dynamic surface tension of ink is an important factor in the design of an ink tank.

The present invention is provided based on the following results obtained by studying the above described problems.

1) For ink for which a dynamic surface tension change has been performed, when its surface tension upon dynamic migration at the initial displacement is higher than the interfacial tension of an ink retention member, ink permeating the ink retention member, especially the gas-liquid interface thereof, tends to be difficult to move, and effects for inhibiting ink leakage upon the occurrence of shock are generated. On the other hand, during an operation for injecting ink into an ink tank or for supplying ink from the ink tank to a recording head, displacement is comparatively steady for an extended period of time, compared with the initial displacement, for which a very small period of time is required. When the dynamic ink surface tension during the steady displacement, for which a comparatively long period of time is required, is lower than the interfacial surface tension of the ink retention member, the process for filling the ink retention member, the process for ink permeation of the ink retention member, and the process for supplying ink to the recording head can be satisfactorily performed. A shock applied during physical distribution, or upon the mounting of a recording head in a recording apparatus, corresponds to the initial displacement, and when ink having a dynamic surface tension change property that can proportionally cope with both the initial displacement and the steady displacement is employed, the above described objective can be achieved. As a result, the degree of freedom available in the design of the structure and the shape of an ink tank and in the selection of a material to be used for an ink retention member is increased.

2) Furthermore, the ink tip end of a probe that enters the area of a new ink retention member is in the initial displacement. At this time, when the dynamic ink surface tension is higher than the interfacial tension of the ink retention member, the ink filling process is appropriately controlled in a uniform diffusion manner, and a permeation speed is obtained at which ink will not overflow. As a result, a bubble generation problem, the generation of bubbles due to air in the ink retention member, can be thoroughly resolved. On the other hand, when the surface tension of ink is lower than the interfacial tension of the ink retention member, the permeability of ink in the ink retention member is high, so that the permeation speed of ink is maximized toward a special portion that is affected by variances in a fiber structure or a distribution of bubbles, and the ink filling process differs. Particularly, for ink whose dynamic surface tension at the initial displacement is set high, the permeation speed is properly controlled, and the uniform permeation of ink is performed from the injection portion, so that an ink tank is obtained in which the amount of ink is uniformly distributed. In addition, since the dynamic ink surface tension for the steady displacement is set lower than the interfacial tension of the ink retention member, the supply of ink can be smoothly continued, up to the tip end of the portion permeated by the ink.

A change in the dynamic ink surface tension can be designated in consonance with the target performance of the ink tank. And it is preferable that the dynamic ink surface tension in the lifetime of 50 msec, obtained by the maximum bubble pressure method, be greater than the interfacial tension of the ink retention member. It is further preferable that the dynamic ink surface tension in a lifetime of 5000 msec, obtained by the maximum bubble pressure method, be lower than the dynamic ink surface tension in the lifetime of 50 msec, and that a difference between the dynamic ink surface tensions be equal to or greater than 8 mN/m. It is even more preferable that this difference be equal to or smaller than 30 mN/m.

For an ink tank according to a first aspect of the present invention, the following relationship is established between ink and an ink retention member.

(1) The dynamic ink surface tension in the lifetime of 50 msec is greater than the interfacial tension of the ink retention member, and the dynamic ink surface tension in the lifetime of 5000 msec is lower than the interfacial surface of the ink retention member.

(2) A difference between the dynamic ink surface tension in the lifetime of 50 msec and the dynamic ink surface tension in the lifetime of 5000 msec is equal to or greater than 8 mN/m.

Further, for an ink tank according to a second aspect of the present invention, the following relationship is established between ink and an ink retention member.

(1) The dynamic ink surface tension in the lifetime of 50 msec is greater than the interfacial tension of the ink retention member, and within a lifetime of 5000 msec, the dynamic ink surface tension becomes lower than the interfacial tension of the ink retention member. It is more preferable that the lifetime of the period during which the dynamic surface tension of ink becomes lower than the interfacial tension of the ink retention member not exceed 500 msec.

The present invention will now be described in more detail by employing the best mode for carrying out the invention. A dynamic surface tension employed in this invention is a value measured at 25 degrees Centigrade.

As described above, as a capillary force of a negative pressure generating member with respect to ink, the technical idea of this invention focuses on capillary force change, occurring within a short period of time, to counter shock during physical distribution and to counter shock upon the mounting a recording head, and also focuses on a capillary force change, occurring within a longer period of time, while ink is being used, and employs, as its main purpose, the adjustment of the dynamic surface tension of the ink.

Individual problems will be described based on the opinions of the present inventors.

First, a description will be given for the leakage of ink caused by shock during physical distribution, and the regressive movement of ink, at a discharge port, that is due to shock that occurs upon the mounting a recording head. These phenomena are very drastic interfacial phenomena, the result of the migration of ink, in an ink retention member, within a short period of time (msec order). This problem can be handled by preventing rapid wetting by ink relative to the ink retention member. As a method for preventing wetting between ink and the ink retention member, the surface tension of ink need only be set higher than the surface tension of a print holding member. As a result, the movement of ink due to shock can be prevented, and accordingly, the leakage of ink can be suppressed.

Next, the efficient use of ink, before being exhausted, will now be described. As shown in FIG. 1, when the surface tension of ink is low, a period for the amount of ink available to use is extended until the static negative pressure PB, whereat ink is exhausted, is reached. That is, when during use the surface tension of ink is reduced, the efficiency with which ink is used can be improved. The static negative pressure PB, whereat ink is exhausted, is determined in accordance with the capillary forces which are depending on physical properties of the ink retention member and ink.

The relationship between the ink retention member and ink during use is a capillary migration phenomenon of an ink-air interface, at the ink retention member, that is consonant with the amount of ink discharged through the recording head. The speed of the capillary migration phenomenon, occasioned by the ink-air interface at the ink retention member, is much slower than that at the time of a shock during physical distribution or a shock following the mounting of the recording head. That is, as a method for controlling the efficient use of ink, effective means is for the surface tension of ink to be high for a rapid (short-time) interface phenomenon, or to be low for a slow (long-time) interface phenomenon. It is important to focus both on the short-time phenomena and on the long-time interface phenomena, for based on these, a conclusion arrived at was that it is effective to employ ink whose dynamic surface tension is increased for a long-time interface phenomenon and is reduced for a short-time interface phenomenon.

Further, when ink having a high surface tension is injected into the ink retention member, permeation effects relative to the ink retention member are low. Thus, for ink having a surface tension higher than the surface energy of the ink retention member, as described above, a special process is required, e.g., extra ink is injected by reducing or increasing pressure (the ink retention member is forcibly wetted), thereafter and the extra ink is removed. For this injection process, a conclusion was reached that ink whose surface tension becomes high for a short-time interface phenomenon, and becomes low for a long-time interface phenomenon, is effective. That is, immediately after this ink is injected, wetting is not exhibited, relative to the ink retention member; however, when an initial period of time has elapsed, the surface tension is lowered, and wetting occurs relative to the holding member. Therefore, a special process, such as injection performed by reducing or increasing pressure, is not required. At this time, a period wherein wetting begins to be exhibited, between the injected ink and the ink retention member, should be equal to or longer than a period in which wetting does not appear, as for a shock that occurs within a short time, such as a shock during physical distribution, or a shock occasioned by vibration upon the mounting of a recording head (for a period of 50 msec, the surface tension of ink need only be equal to or greater than the interfacial tension of the ink retention member).

There are proposals, as in U.S. Publication No. 2004/0069183 and U.S. Pat. No. 7,037,362, concerning a change in the dynamic surface tension of ink. According to U.S. Publication No. 2004/0069183, 7 mN/m or smaller is employed as a difference between the dynamic surface tension at 10 Hz (100 msec) and the dynamic surface tension at 1 Hz (1000 msec) in the ink discharged state. This description concerns the balancing of surface tension at the discharge port and at the ink chamber in the discharged state. That is, a phenomenon occurring at the discharge port at the ink discharge time and a phenomenon occurring in the ink chamber at the same time are described, and according to this case, these phenomenon are those occurring at different times from a phenomenon that occurred due to an external shock and a phenomenon that occurred when ink was exhausted. Furthermore, the dynamic surface tension at 10 Hz (100 msec), described in U.S. Publication No. 2004/0069183 and U.S. Pat. No. 7,037,362, is appropriate as a factor related to vibration within a tiny area for the discharge of ink through a discharge port of the recording head. However, timewise, the dynamic surface tension at 10 Hz (100 msec) is too briefly sustained, relative to the time at which vibration of the ink tank, occasioned by an external shock, is stopped. Further, since efficiency in the use of ink represents a period consonant with a moderate change in the interface between the ink and the atmosphere in the ink retention member of the ink tank, the dynamic surface tension at 1000 msec is also too briefly sustained, and depending on the ink type, the change in the surface tension may not as yet be settled.

The maximum bubble pressure method employed in this invention to measure dynamic surface tension will now be described.

The maximum bubble pressure method is a method used for measuring a maximum pressure that is required to discharge a bubble that is formed at the distal end of a probe (canaliculus: also called a capillary) that is immersed in a liquid to be measured, and for obtaining a surface tension based on the maximum pressure. Further, in a process for forming a bubble at the distal end of a probe using the maximum bubble pressure method, a lifetime period is a period extending from the time at which the surface of a new bubble is formed after a bubble is separated from the distal end of the probe, to the time at which the maximum bubble pressure is reached (the time at which the curvature radius of a bubble equals to the radius of the distal end of the probe).

The dynamic surface tension, for the lifetime of 5000 msec, obtained by the maximum bubble pressure method, is a value slightly higher than a static surface tension that is generally employed, i.e., a surface tension obtained by the Wilhelmy method (plate method). For ink employed for common ink jet recording, the lifetime of 5000 msec for measuring the dynamic surface tension using the maximum pressure method is a period wherein a change in the dynamic surface tension disappears. Therefore, in this invention, it is necessary to control not only the static dynamic surface tension but also the dynamic surface tension for the lifetime of 50 msec and for the lifetime of 5000 msec, using the maximum pressure method.

Figure 2:
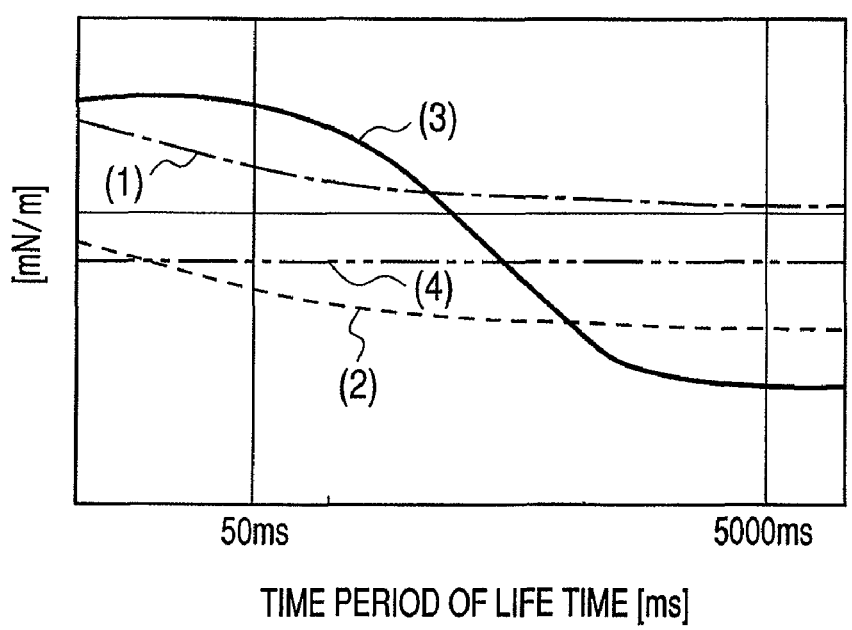
FIG. 2 is a graph showing a change in the dynamic surface tension of ink.

FIG. 2 is a graph illustrating a general change in dynamic surface tension. In FIG. 2, (1) indicates a dynamic surface tension for conventional ink (ink having a high static surface tension), and (2) indicates a dynamic surface tension for another conventional ink (ink having a low static surface tension). For the conventional ink, the change in the dynamic surface tension is small, and when the static surface tension is changed, a difference in the dynamic surface tensions for 50 msec and for 5000 msec is unchanged. (3) indicates the ink for this invention having a dynamic surface tension change. It is found that, for the ink of this invention that has a dynamic surface tension change, the surface tension has a larger transient tension change than has the conventional ink.

<Ink Tank>

An appropriate ink tank for the present invention will now be described. Ink tanks can be roughly categorized as being one of the following two types.

(A) An ink tank that is integrated with an ink jet recording head and is attached to a carriage (an integrated type).

(B) An ink tank that is separable from an ink jet recording head, and can be attached to a carriage as a single unit (a separate type)

The structures of these types will now be briefly described.

<Separate Type>

The separate type includes the following two types.

An ink tank in which an absorbent member is stored substantially in the entire area of the ink tank (hereinafter referred to as an all-sponge tank, for the sake of convenience).

An ink tank wherein the interior is divided into two chambers, and an absorbent member is stored in one chamber while ink is directly retained in the other chamber (hereinafter referred to as a half-bare tank).

<Half-Bare Tank>

Figure 3A:
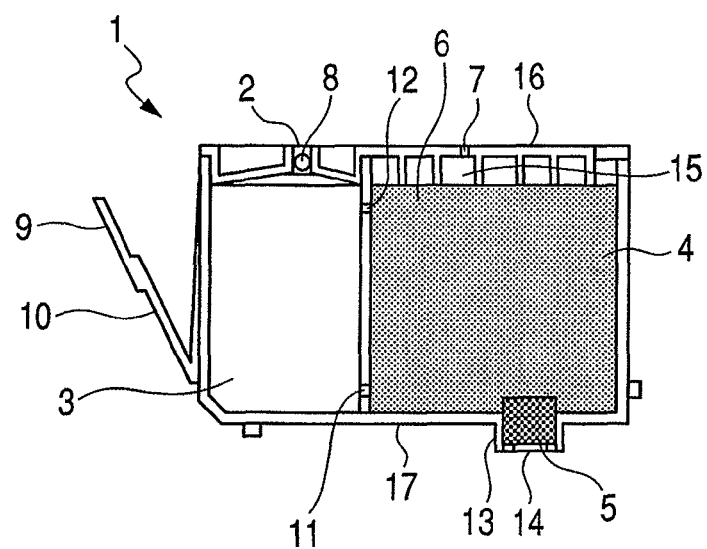
FIGS. 3A and 3B are diagrams illustrating example ink tank structures.

As shown in FIG. 3A, a half-bare tank 1 has a substantially rectangular parallelepiped shape, and an atmosphere communication port 7 is formed in an upper wall 16, which becomes an upper face, in the tank use posture. Further, an ink supply barrel 13 is formed in a lower wall 17 of the ink tank 1, which becomes the bottom, in the tank use posture. The ink supply barrel 13 has an ink supply cylinder 14, which serves as an opening for the resupply of a discharge liquid, and a cylindrical shape that projects downward when the tank is in use. In addition, a flexible lever member 9 is integrally formed with a side wall, which forms part of a case for the ink tank 1, and a stopper protrusion 10 is intermediately formed in the lever member 9.

The ink tank 1 also includes: a negative pressure generating member containing chamber 4 (a first chamber), in which an absorbent member is stored that serves as a negative pressure generator; and a liquid containing chamber 3 (a second chamber), in which ink can be directly retained. In the negative pressure generating member containing chamber 4, a buffer 15, into which the negative pressure generating member is not extended, is provided in the vicinity of the upper wall 16, and communicates with the outside through the atmosphere communication port 7. The ink supply cylinder 14 is formed in the negative pressure generating member containing chamber 4, and a pressure-contact member 5 is fitted into the supply cylinder 14. The pressure-contact member 5 has a higher capillary force than has the absorbent member 6, and is not easily deflected by pressure. The liquid containing chamber 3 is adjacent to the negative pressure generating member containing chamber 4, and between them is a partition wall 12 through which they communicate, via the communication port 11. Except for the communication port 11, the liquid containing chamber 3 substantially forms a closed space. An ink injection opening 2 is formed in the upper face of the second chamber 3 for the injection of ink and for externally discharging air from the second chamber 3 during the injection of ink, and is closed with a sealing member 8, such as a ball or a film.

<All-Sponge Tank>

Figure 3B:
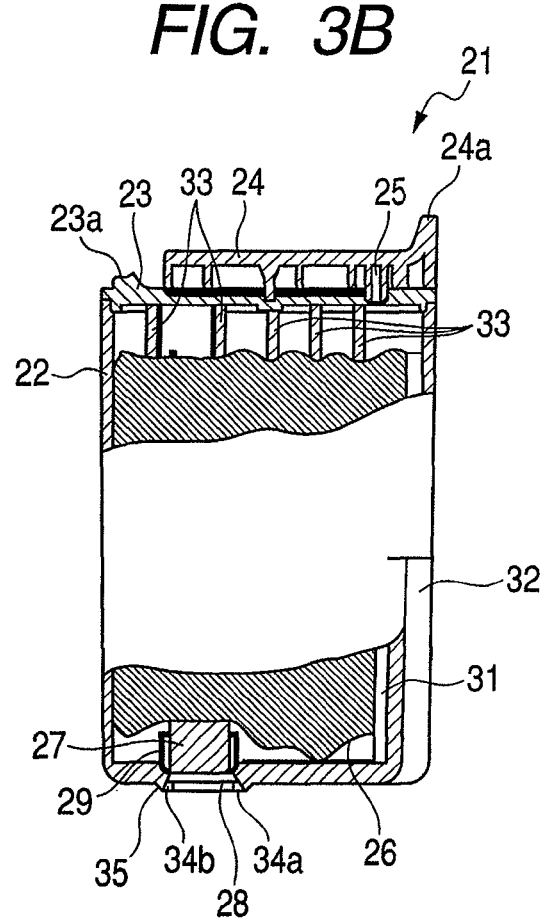

As shown in FIG. 3B, an all-sponge tank 21 includes an ink containing case 22 and a lid member 23, which covers the case 22 and for which an atmosphere communication opening 25 is formed. Further, this ink tank 21 includes a space above the lid member 23 that serves as a buffer chamber, for preventing the leakage of ink through the atmosphere communication opening 25 to the outside. In addition, the ink tank 21 includes an air release opening, which is formed at a position different from the atmosphere communication opening 25, and an upper member 24, for which a knob 24a is provided that is used to detach from the ink tank 21 a recording head cartridge (not shown).

On the bottom of the ink tank 21, an ink supply opening 28 into which a lead-in pipe for the recording head cartridge is to be inserted, a rib 35 projectedly provided at the circumference of the ink supply opening 28, and sloping portions 34a and 34b are formed to connect the ink supply opening 28 and the rib 35. The rib 35 is employed as a guide for mounting the ink tank 21.

As shown in FIG. 3B, an ink absorbent member 26 is stored in the ink tank 21, and an ink guide member 27 is arranged between the ink absorbent member 26 and the ink supply opening 28. Further, an upright support member 29 is provided for the ink supply opening 28 in order to hold the ink guide member 27 inside the ink tank 21. A slit that connects the interior of the ink tank 21 with the outside is formed in part of the internal wall of the support member 29.

Furthermore, ribs 33 are formed on the lid member 23 to define predetermined spaces between the ink absorbent member 26 and the lid member 23, while a belt-like convex portion 23a is formed on the obverse face of the lid member 23. The belt-like convex portion 23a engages a portion of the recording head cartridge (not shown) and applies force to the ink tank 21 in a downward direction, from above, so that the state wherein the ink tank 21 is mounted on the recording head cartridge is stabilized.

In addition, multiple vertically continuous ribs 31 are formed on the internal side walls of the ink tank 21, so that predetermined spaces are defined between the side faces of the ink tank 21 and the ink absorbent member 26.

<Ink Tank of Integrated Type with Ink Jet Recording Head>

An ink tank of an integrated type with an ink jet recording head will now be described. FIGS. 4 to 9 are diagrams for explaining an appropriate recording head, for carrying out the present invention, or that can appropriately be employed for the present invention. The individual components will be described while referring to these drawings.

Figure 4:
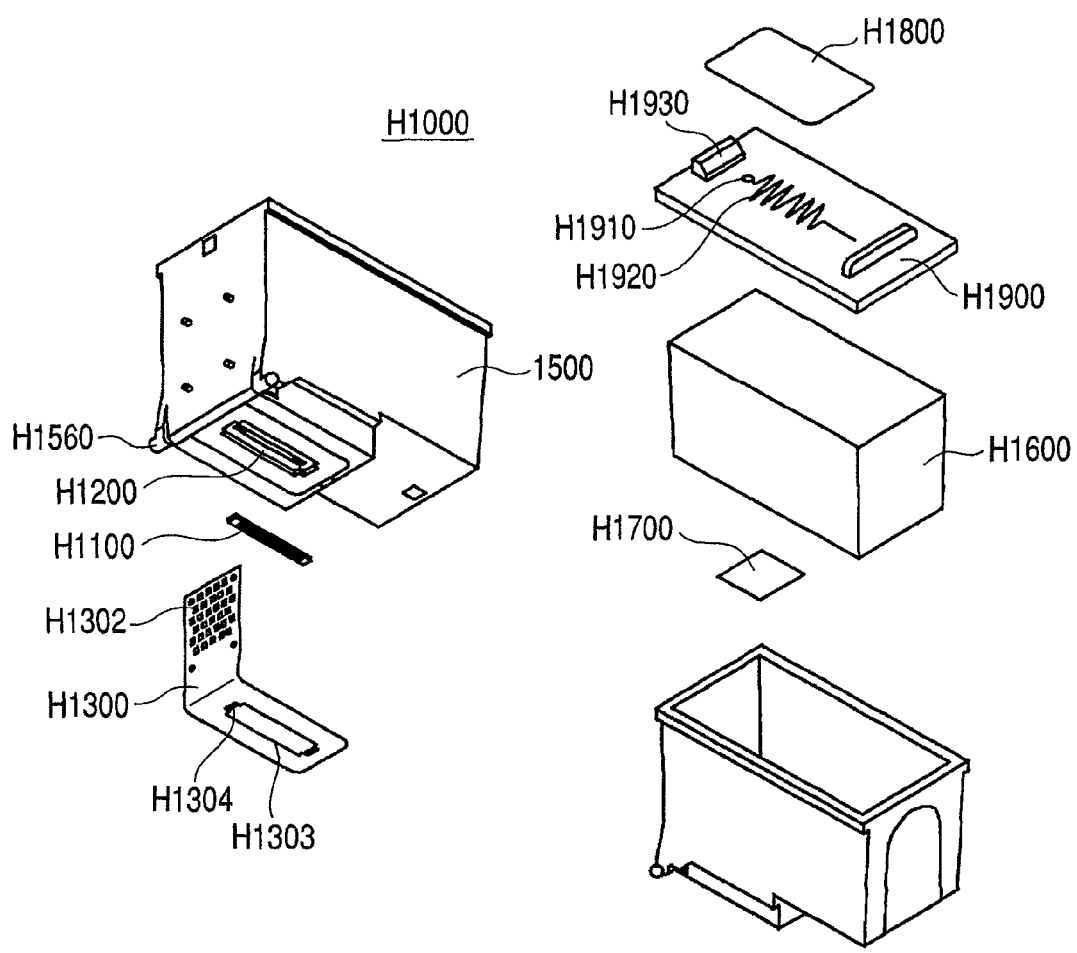
FIG. 4 is a diagram for explaining the structure of an ink tank to be integrated with an ink jet recording head.
Figure 5:
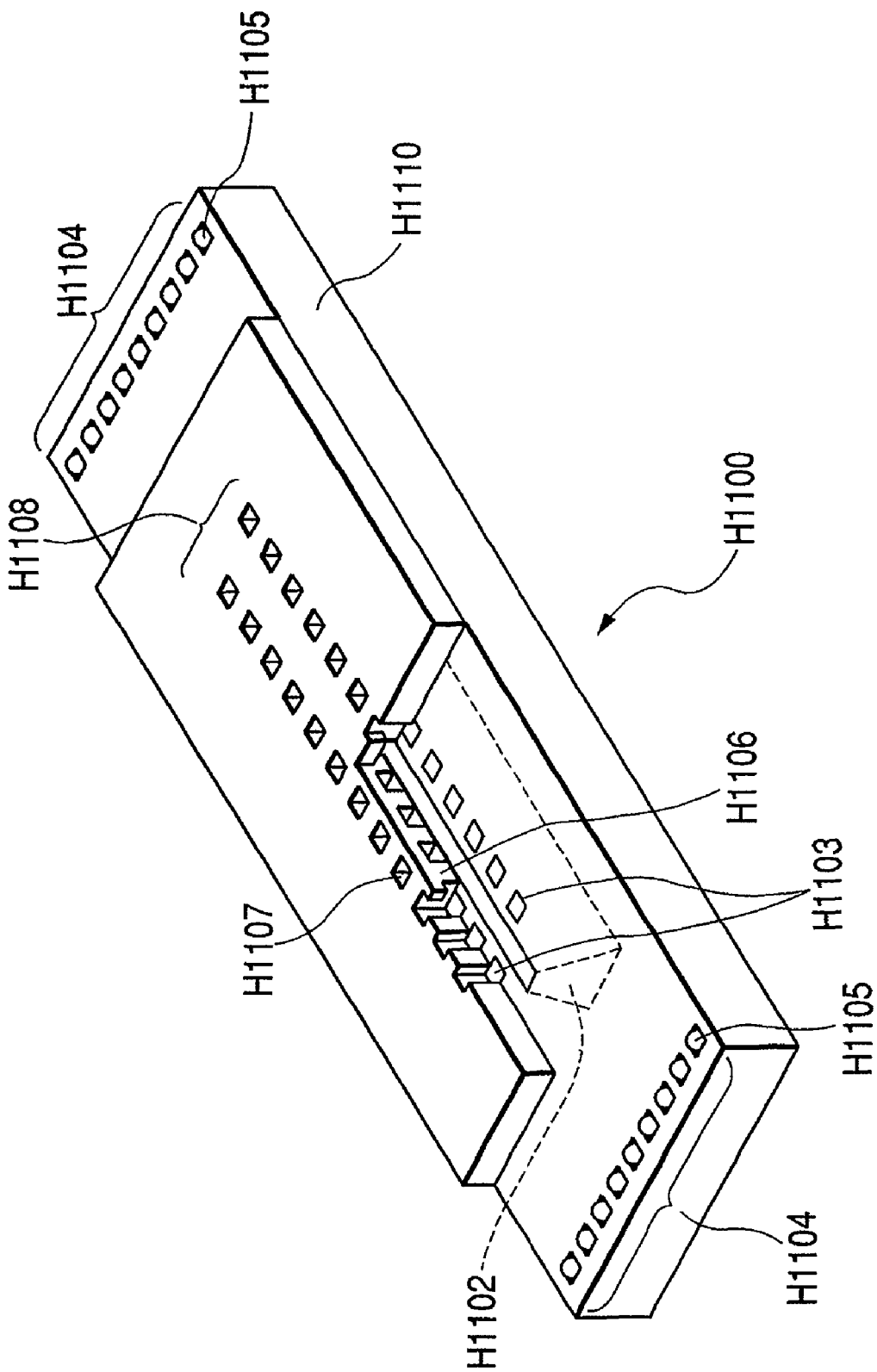
FIG. 5 is a diagram for explaining the structure of an ink tank to be integrated with an ink jet recording head.
Figure 6:
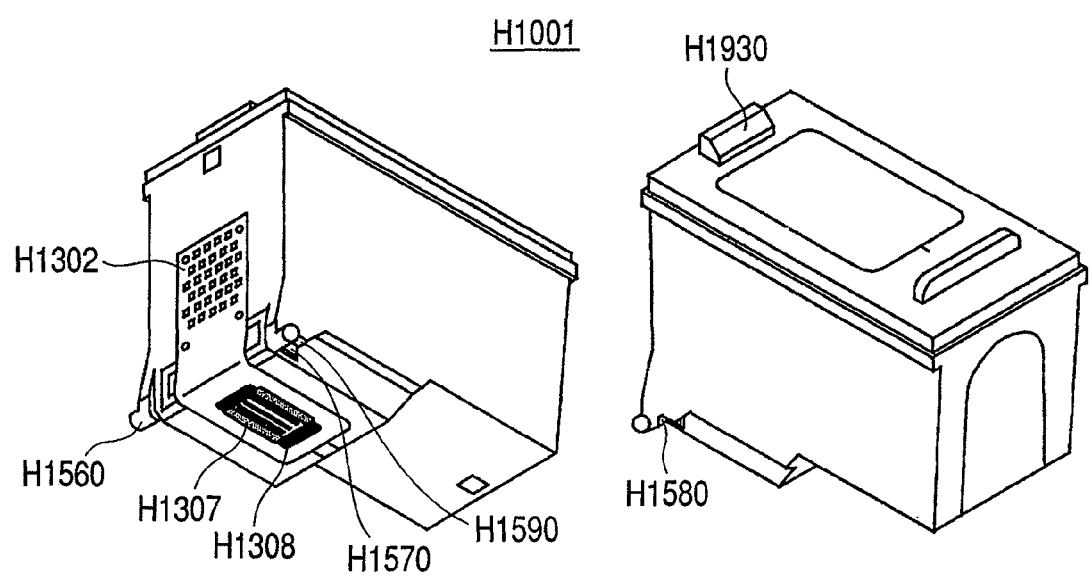
FIG. 6 is a diagram for explaining the structure of an ink tank to be integrated with an ink jet recording head.

As shown in FIGS. 4 to 6, a recording head is a structure integrated with an ink tank. Black ink is loaded into a first recording head H1000 in FIG. 4, and colored inks (cyan ink, magenta ink and yellow ink) are loaded in a second recording head H1001, in FIG. 6. The recording heads H1000 and H1001 are fixedly supported by the positioning unit of a carriage, which is mounted on the main body of an ink jet recording apparatus, and electric contact points. Further, the recording heads H1000 and H1001 are also attachable to and detachable from the carriage so they can be exchanged when the inks loaded in the recording heads H1000 and H1001 are exhausted.

Next, in due course, the components of the individual recording heads H1000 and H1001 will be described in detail.

(1) Recording Head

The first recording head H1000 and the second recording head H1001, of this embodiment, are bubble jet (registered trademark) recording heads, wherein an electro-thermal transducing element, which generates thermal energy, is employed to cause the film boiling of ink in accordance with an electric signal. That is, the first and second recording heads H1000 and H1001 are recording heads of a so-called side shooter type, for which an electro-thermal transducing element and an ink discharge port are arranged opposite each other.

(1-1) First Recording Head

The first recording head H1000 is employed for black ink. As shown in the exploded perspective view in FIG. 4, the first recording head H1000 includes a recording element substrate H1100, an electric wiring tape H1300, an ink supply/holder H1500, a filter H1700, an ink absorbent member H1600, a lid member H1900 and a seal member H1800.

(1-1-1) First Recording Element Substrate

FIG. 5 is a partially cutaway perspective view for explaining the structure of the first recording element substrate H1100. To obtain the first recording element substrate H1100, an ink supply opening H1102, which is an ink flow path shaped like a long groove, is formed by penetrating an Si board H1110 that is 0.5 to 1 mm thick, using anisotropic etching or a sandblasting process that employs an Si crystal orientation.

An array of electro-thermal transducing elements H1103 is arranged on either side of the ink supply opening H1102, and electric wiring made of Al (not shown) is formed to supply electric power to the electro-thermal transducing elements H1103. The electro-thermal transducing elements H1103 and the electric wiring are formed using the film formation technique. The individual arrays of the electro-thermal transducing elements H1103 are formed in a zigzag manner, i.e., the discharge ports of the individual arrays are shifted, so not positioned perpendicularly to a direction in which the array is formed. Further, electrode portions H1104 are formed along both side edges of the first recording element substrate H1100, outside the electro-thermal transducing elements H1103 to supply electric power to the electric wire, or to supply an electric signal for driving the electro-thermal transducing elements H1103. Bumps H1105 made of Au, for example, are formed on the electrode portions H1104. A discharge port group 1108 is formed by forming plural discharge ports 1107 at a plate, and ink is supplied to the individual discharge ports from flow paths that are separated by ink flow path walls 1106.

(1-1-2) Ink Supply/Holding Member

The ink supply/holding member H1500 is, for example, formed of a resin. A resin material mixed with a glass filler at 5 to 40% can be employed in order to improve the shape rigidity. As shown in FIG. 4, the ink supply/holding member H1500 includes the absorbent member H1600, which retains ink and generates a negative pressure. With this arrangement, the ink supply/holding member H1500 provides an ink tank function and an ink supply function for guiding ink to the first recording element substrate H1100. Generally, a compressed polypropylene (PP) fiber is employed as the ink absorbent member H1600. However, a compressed urethane fiber may be employed, or any other arbitrary fiber may be employed so long as ink is held by generating a negative pressure using the capillary action of ink. At the upstream boundary of the ink flow path relative to the ink absorbent member H1600, the filter H1700 is joined by welding, in order to prevent dust from entering the first recording element substrate H1100. The filter H1700 can be an SUS metal mesh type, although an SUS metal fiber sintered type is more appropriate.

Downstream of the ink flow path, an ink supply opening H1200 is formed to supply black ink to the first recording element substrate H1100. The first recording element substrate H1100 is accurately positioned and securely adhered to the ink supply/holding member H1500 so that the ink supply opening 1102 of the first recording element substrate H1100 communicates with the ink supply opening H1200 of the ink supply/holding member H1500. A first adhesive used for this adhesion should have a low viscosity, a low curing temperature and be ink resistant, and should be cured for a short period of time, so as to be comparatively very hard after it has been cured. For example, as the first adhesive, a thermosetting adhesive is employed that contains an epoxy resin as a main element, and it is appropriate for that the adhesive applied have a thickness of about 50 µm.

One part of the reverse face of the electric wiring tape H1300 is fixed, using a second adhesive, to the flat face of the ink supply/holding member H1500, which surrounds the portion to which the first recording element substrate H1100 is bonded. The portion where the first recording element substrate H1100 is electrically connected to the electric wiring tape H1300 is sealed by a first sealing agent H1307 and a second sealing agent H1308 (see FIG. 6), so that this portion is protected from ink corrosion and external shocks. The first sealing agent H1307 mainly covers the reverse side of the portion where electrode terminals 1302 of the electric wiring tape H1300 are connected to the bumps H1105 of the first recording element substrate H1100, and a peripheral portion H1303 of the first recording element substrate H1100. The second sealing agent H1308 covers an obverse side H1304 of the above described connected portion. The non-adhered portion of the electric wiring tape H1300 is folded, and fixed, using thermal calking or adherence to a side face that is substantially perpendicular to the face of the ink supply/holding member H1500, to which the first recording element substrate H1100 is bonded.

(1-1-3) Lid Member

The lid member H1900 tightly closes the ink supply/holding member H1500 by being welded to the upper opening of the ink supply/holding member H1500. A small opening H1910 and a fine groove 1920, communicating with the small opening H1910, are formed in the lid member H1900 in order to remove pressure fluctuation inside the ink supply/holding member H1500. When the small opening H1910 and most of the fine groove H1920 are covered by a seal member H1800 and one end of the fine groove H1920 is exposed, an atmosphere communication port is provided. Further, an engagement portion H1930 is formed on the lid member H1900 to secure the first recording head to the ink jet recording apparatus.

(1-2) Second Recording Head

The second recording head H1001 illustrated in FIG. 6 is for discharging ink of three colors, cyan, magenta and yellow. As illustrated in the exploded perspective view in FIG. 7, the second recording head H1001 includes: a recording element substrate H1101, an electric wiring tape H1301, an ink supply/holding member H1501, filters H1701, H1702 and H1703 and ink absorbent members H1601, H1602 and H1603. The second recording head H1001 also includes a lid member H1901 and a sealing member H1801.

(1-2-1) Second Recording Element Substrate

Figure 8:
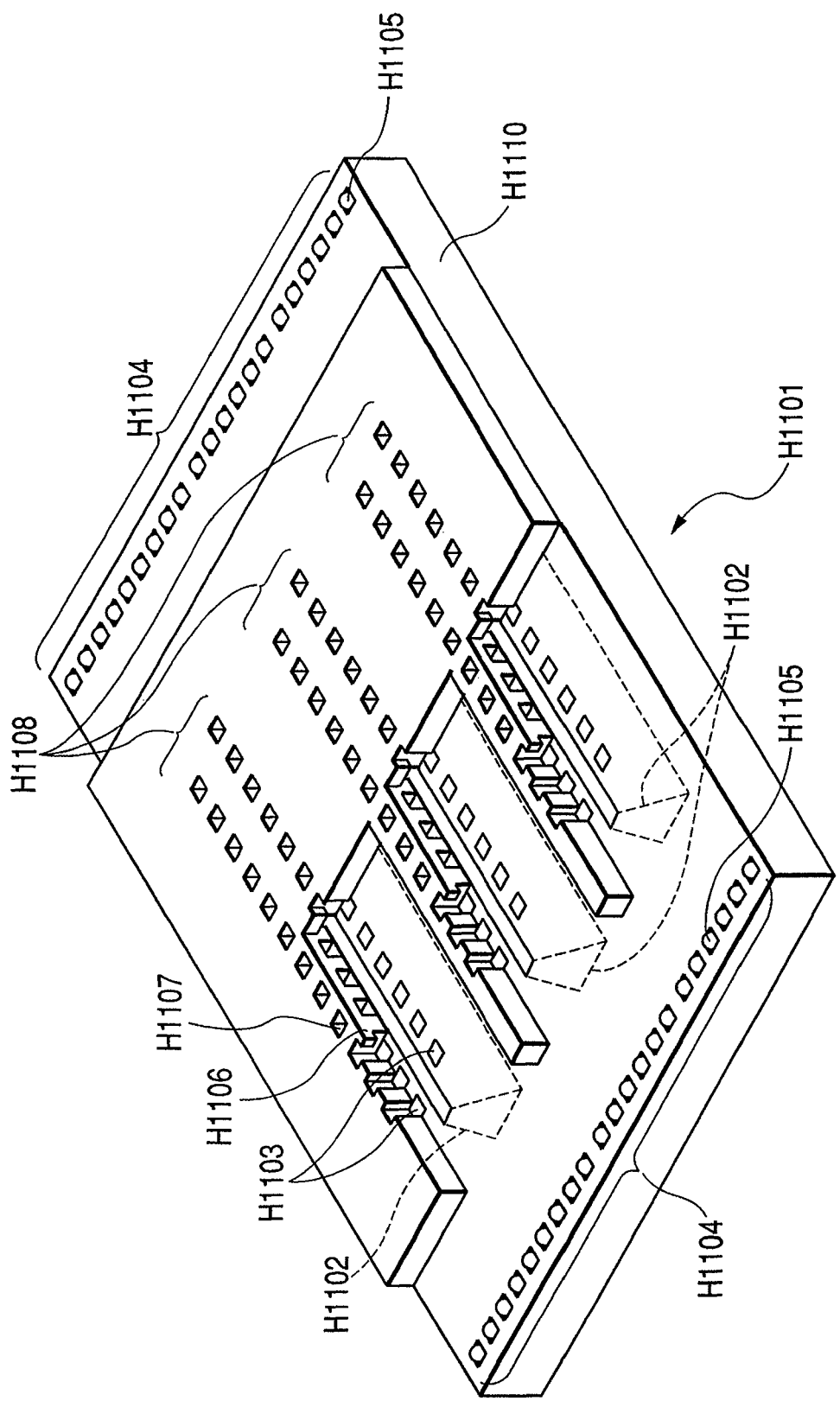
FIG. 8 is a diagram for explaining the structure of an ink tank to be integrated with an ink jet recording head.

FIG. 8 is a partially cutaway perspective view for explaining the structure of the second recording element substrate H1101. Three ink supply ports H1102 for cyan, magenta and yellow are arranged parallel to each other, thereby forming individual discharge port groups H1108. An array of electro-thermal transducing elements H1103 and an array of discharge ports H1107 are arranged in a zigzag manner on either side of each ink supply port H1102. As well as the Si substrate H1110 of the first recording element substrate H1100, electric wiring, a fuse and electrode portions H1104, for example, are formed on an Si substrate H1101, and ink flow path walls H1106 and discharge ports H1107 are formed of a resin material by photolithography. Bumps H1105 made of Au, for example, are formed on the electrode portions H1104 that supply electric power to the electric wiring.

(1-2-2) Electric Wiring Tape

The electric wiring tape H1301 forms an electric signal path for transmitting an electric signal to the second recording element substrate H1101 to discharge ink. An opening is formed for installing a recording element substrate, and near the edge of this opening, electrode terminals H1304 are formed so as to be connected to the electrode portion H1104 of the second recording element substrate H1101. Further, external signal input terminals H1302 are formed on the electric wiring tape H1301 to receive an electric signal from the main body, and the electrode terminals 1304 and the external signal input terminals H1302 are connected together by a continuous copper foil wiring pattern.

For establishing an electric connection for the electric wiring tape H1301 to the second recording element substrate 1101, for example, the bumps H1105, formed on the electrode portions H1104 of the second recording element substrate H1101, are electrically joined, using a thermal ultrasonic fixing method, to the electrode terminals H1304 of the electric wiring tape H1301, which correspond to the electrode portions H1104 of the second recording element substrate H1101.

(1-2-3) Ink Supply/Holding Member

Figure 7:
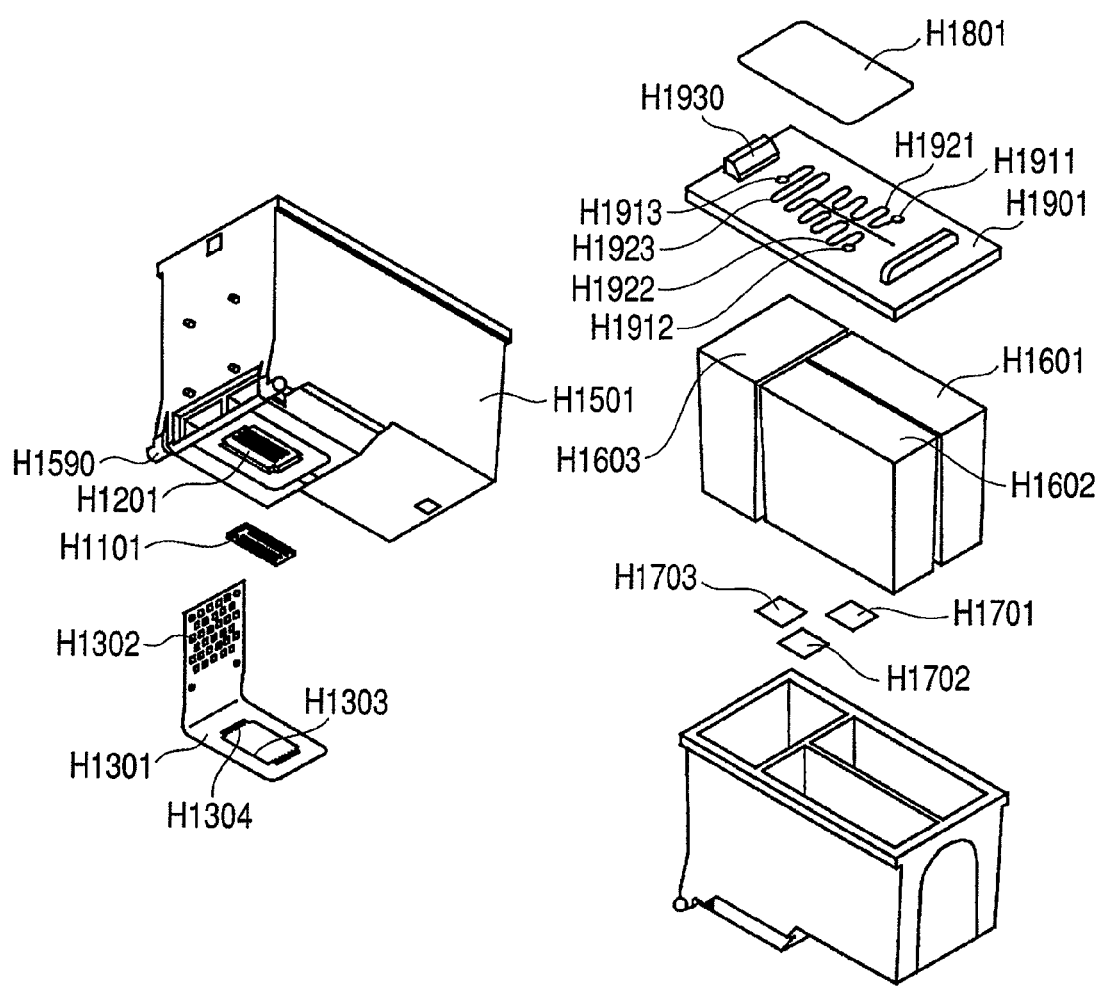
FIG. 7 is a diagram for explaining the structure of an ink tank to be integrated with an ink jet recording head.

The ink supply/holding member H1501 is made, for example, of a resin. A resin material mixed with a glass filler at 5 to 40% can be employed to improve the shape rigidity. As illustrated in FIG. 7, the interior of the ink supply/holding member H1501 is defined to provide spaces for separately storing the absorbent members H1601, H1602 and H1603, which hold cyan, magenta and yellow ink and generate a negative pressure, and independent ink flow paths are formed to guide ink to the individual ink supply ports H1102 of the second recording element substrate H1101. With this arrangement, the ink supply/holding member H1501 provides an ink tank function and an ink supplying function. A compressed PP fiber is employed for the ink absorbent members H1601, H1602 and H1603; however, a compressed urethane fiber can also be employed. At the upstream boundaries of the individual ink flow paths, relative to the ink absorbent members H1601, H1602 and H1603, the filters H1701, H1702 and H1703 are joined by using welding, in order to prevent dust from entering the second recording element substrate H1101. The filters H1701, H1702 and H1703 may be an SUS metal mesh type; however, an SUS metal fiber sintered type is more appropriate.

Downstream of the ink flow paths, an ink supply opening H1201 is formed to supply cyan, magenta and yellow ink to the second recording element substrate H1101. The second recording element substrate H1101 is accurately positioned and securely adhered to the ink supply/holding member H1501, so that the ink supply ports H1102 of the second recording element substrate H1101 can communicate with the ink supply opening H1201 of the ink supply/holding member H1501. A first adhesive used for this adhesion should have a low viscosity, a low curing temperature and be ink resistant, and should be cured for a short period of time so that it becomes comparatively, very hard after it is cured. For example, as the first adhesive, a thermosetting adhesive that contains an epoxy resin as a main element is employed, and it is appropriate that the adhesive applied have a thickness of about 50 μm.

Further, one part of the reverse face of the electric wiring tape H1301 is fixed, using a second adhesive, to the flat face around the ink supply port H1201. The portion where the second recording element substrate H1101 is electrically connected to the electric wiring tape H1301 is closed by the first sealing agent H1307 and the second sealing agent H1308 (see FIG. 6) to protect the electrically connected portion from ink corrosion or external shock. The first sealing agent H1307 covers mainly the reverse side of the portion where the electrode terminals H1302 of the electric wiring tape H1301 are connected to the bumps H1105 of the recording element substrate H1101 and the peripheral portion of the recording element substrate H1101, and the second sealing agent H1308 covers the obverse side of the above described connected portion. The non-adhered portion of the electric wiring tape H1301 is folded and fixed, by using thermal calking or adherence, to the side face that is almost perpendicular to the face where in the ink supply opening H1201 of the ink supply/holding member H1501 is formed.

(1-2-4) Lid Member

The lid member H1901 closes the separate spaces inside the ink supply/holding member H1501 by being welded to the upper opening of the ink supply/holding member H1501. In the lid member H1901, small openings H1911, H1912 and H1913, and fine grooves H1921, H1922 and H1923 which communicate with the openings respectively, are formed in order to remove pressure fluctuation within the individual chambers of the ink supply/holding member H1501. One ends of the fine grooves H1921 and H1922 merge with the middle of the fine groove H1923. Further, all the small openings H1911, H1912 and H1913, and the fine grooves H1921 and H1922 and most of the fine groove H1923 are covered with the sealing member H1801, leaving one end of the fine groove H1923 exposed. In this manner, an atmospheric communication port is obtained. In addition, an engagement portion H1930 is formed on the lid member H1901 to fix the second recording head to the ink jet recording apparatus.

(1-3) Mounting Recording Head On Ink jet Recording Apparatus

As illustrated in FIGS. 4 to 6, the first recording head H1000 and the second recording head H1001 include mounting guides H1560 and H1590, which guide the respective recording heads to the mounting position for the carriage of an ink jet recording apparatus. The recording head H1000 or H1001 includes an engagement portion H1930 that is to be securely mounted to the carriage using a head set lever. In addition, these recording heads are provided with an X-directional (carriage scan direction) contact portion H1570, a Y direction (recording medium conveying direction) contact portion H1580 and a Z direction (ink discharge direction) contact portion H1590 so as to position the recording heads H1000 and H1001 at a predetermined location on the carriage. When the recording head H1000 or H1001 is positioned using these contact portions H1570, H1580 and H1590, the external signal input terminals H1302 on the electric wiring tape H1300 and H1301 accurately contact the contact pins of the electrically connected portion provided for the carriage.

(2) Ink jet Recording Apparatus

Figure 9:
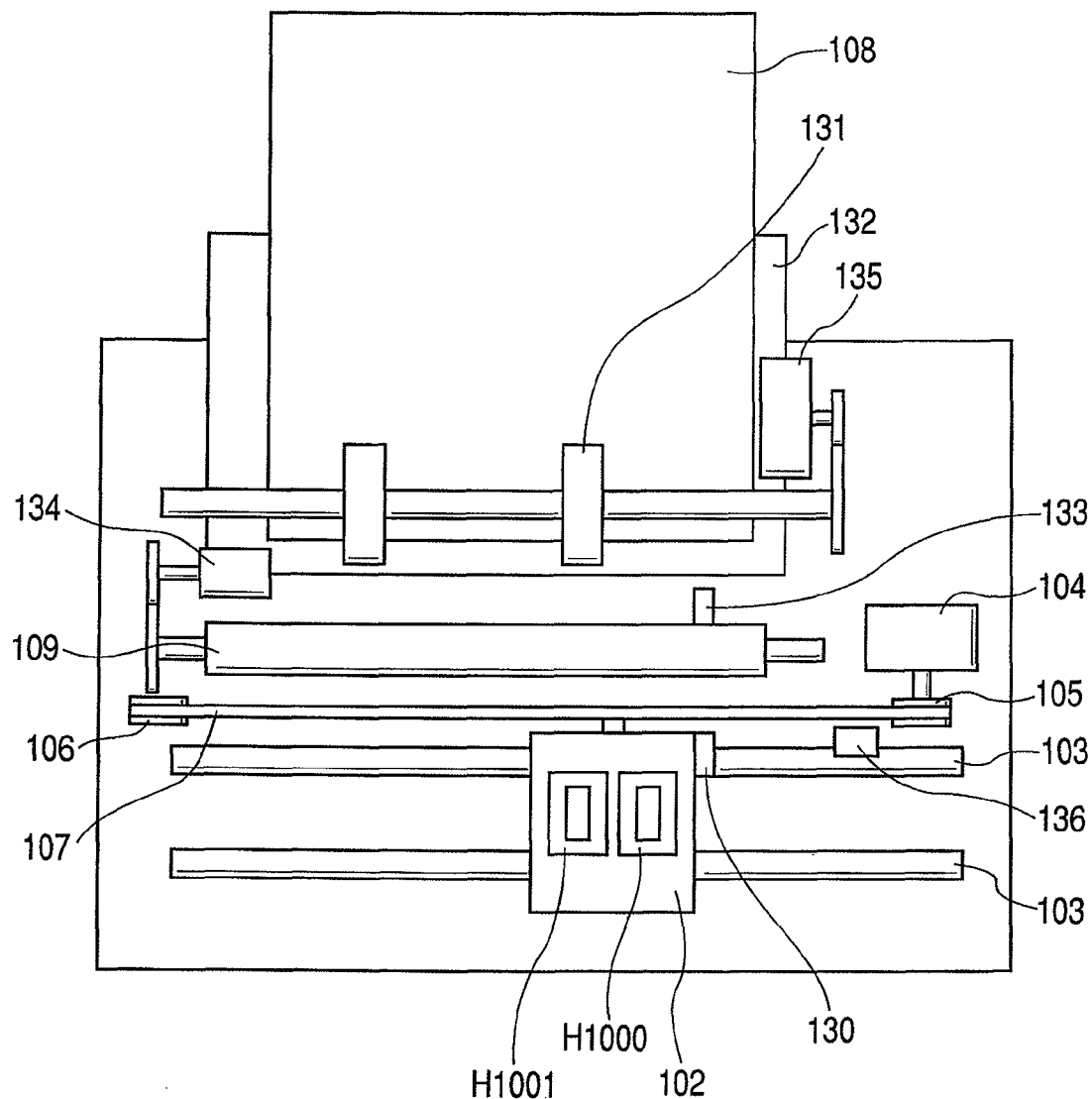
FIG. 9 is a diagram for explaining the arrangement of an ink jet recording apparatus.

A liquid discharge apparatus, on to which the above described cartridge type recording head can be mounted, will now be described. FIG. 9 is an explanatory diagram illustrating an example recording apparatus, on which the liquid discharge recording head of this invention can be mounted.

The recording heads H1000 and H1001 illustrated in FIGS. 4 and 6 are positioned and exchangeably mounted on a carriage 102 in the recording apparatus in FIG. 9. An electrically connected portion is provided for the carriage 102 to transmit a drive signal, for example, to the individual discharge portions through the external signal input terminals of the recording heads H1000 and H1001.

The carriage 102 is supported by a guide shaft 103 that is extended in the main scanning direction in the main body of the apparatus, and is capable of reciprocating along the guide shaft 103. The carriage 102 is driven by a main scanning motor 104 via a drive mechanism, such as a motor pulley 105, a driven pulley 106 and a timing belt 107, and the position and the movement of the carriage 102 are controlled. Further, a home position sensor 130 is provided in the carriage 102, and when the home position sensor 130 on the carriage 102 passes by a shielding plate 136, the position of the carriage 102 can be obtained.

When a pickup roller 131 is rotated by a sheet feeding motor 135 via a gear, a recording medium 108, such as a printing sheet or a thin plastic sheet, is separated and fed one by one by an automatic sheet feeder (ASF) 132. Then, conveying rollers 109 are rotated, and the recording medium 108 is passed through a position (printing section) opposite the discharge port face of the recording heads H1000 and H1001 (sub-scanning). The rotation of the conveying rollers 109 is performed by an LF motor 134 via a gear. Identification performed to determine whether the sheet has been fed and to determine the location of the leading edge of the sheet are performed when the recording medium 108 has passed through a paper end sensor 133. The paper end sensor 133 is also employed to detect the actual position of the trailing edge of the recording medium 108 and to identify the current recording position based on the actual position of the trailing edge.

The reverse face of the recording medium 108 is supported by a platen (not shown) so that a flat print face is formed by the printing unit. The recording heads H1000 and H1001 mounted on the carriage 102 are supported, so that the discharge port faces projects downward, from the carriage 102, and parallel to the recording medium 108 between the two conveying rollers 109.

The recording heads H1000 and H1001 are mounted on the carriage 102, so that the discharge ports of the individual discharge portions are arranged in a direction perpendicularly to a direction in which the carriage 102 scans. With this arrangement, the recording heads H1000 and H1001 discharge a liquid through the discharge port arrays to perform recording.

<Ink>

Ink employed for this invention has as a feature the mixture of a penetrant in the ink, i.e., appropriate types of surfactant and water-soluble organic solvent are mixed at appropriate contents, and the above described characteristics of the dynamic surface tension are obtained. Except for this, the same composition as used for the conventional ink can be employed. The individual elements of the ink employed for this invention will be described.

(Penetrant)

Ink employed for this invention should be a penetrant that contains a surfactant and a water-soluble organic solvent. Also, ink should be adjusted so as to obtain the above described characteristics for the dynamic surface tension. The penetrant for providing ink having the above described characteristic for dynamic surface tension can be as follows; however, the present invention is not limited to these penetrants.

[Surfactant]

At least one of the following nonionic surfactants can be employed: polyoxyethylene alkyl ether, polyoxyethylene fatty acid ester, polyoxyethylene alkyl phenyl ether, fatty acid diethanolamide, a polyoxyethylene polyoxypropylene block copolymer or an acetylene glycol type.

An example anionic surfactant can be constituted as follows: polyoxyethylene alkyl ether sulfate salt, polyoxyethylene alkyl ether sulfonate salt, polyoxyethylene alkyl phenyl ether sulfate salt, polyoxyethylene alkyl phenyl ether sulfonate salt, α-سulfo fatty acid ester salt, alkyl benzene sulfonate salt, alkyl phenol sulfonate salt, alkyl naphthalene sulfonate salt, alkyl tetralin sulfonate salt or dialkyl sulfosuccinate salt.

An example amphoteric surfactant can be constituted as follows: a cationic surfactant, such as alkyl trimethylammonium salt or dialkyl dimethylammonium chloride, or alkylcarboxy betaine.

Of the surfactants, polyoxyethylene alkyl ether is especially appropriate. Further, the carbon atomic number of the alkyl group contained in polyoxyethylene alkyl ether should be 12 to 18, and the alkyl group should be a lauryl, cetyl or oleyl group.

[Water-soluble Organic Solvent]

There is no limitation with respect to a water-soluble organic solvent, just so long as the solvent is adjusted so that ink obtains the above described characteristic of the dynamic surface tension. In this invention, the content (mass %) of the water-soluble organic solvent relative to ink can be from equal to or greater than 3.0 mass % to less than 50.0 mass %, relative to the total mass of ink, as a reference. The specific water-soluble organic solvent can be as follows:

alcohols having a carbon atomic number of 1 to 6, such as ethanol, isopropanol, 2-propanol, n-butanol, isobutanol, butanol, pentanol and hexanol; carboxylic acid amides, such as N,N-dimethylformamide and N,N-dimethylacetamide; ketones, such as acetone, methylethyl ketone and 2-methyl-2-hydroxypentane-4-on; cyclic ethers, such as keto-alcohol, tetrahydrofuran and dioxane; alkylene glycols such as glycerin, ethylene glycol, diethylene glycol, triethylene glycol, tetraethylene glycol, 1,2- or 1,3-propylene glycol, 1,2- or 1,4-butylene glycol and polyethylene glycol; polyhydric alcohols, such as 1,3-butanediol, 1,2- or 1,5-pentanediol, 1,2- or 1,6-hexanediol, dithioglycol, 2-methyl-1,3-propanediol, 1,2,6-hexanetriol and trimethylolpropane; polyalcohol alkyl ethers, such as ethylene glycol monomethyl(or ethyl)ether, diethylene glycol monomethyl(or ethyl)ether and triethylene glycol monoethyl(or butyl)ether; heterocyclic compounds, such as 2-pyrrolidone, N-methyl-2-pyrrolidone, 1,3-dimethyl-2-imidazolidinone and N-methyl morpholine; and sulfur compounds, such as dimethyl sulfoxide.

Among these water-soluble organic solvents, glycerin, ethylene glycol or 2-pyrrolidone, for example, are appropriate. Further, alcohols or alkylene glycols, such as ethanol, 2-propanol, 1,2-pentanediol and 1,2-hexanediol, which are water-soluble organic solvents having high permeability, are preferably to be employed.

(Water)

Ink for this invention should contain water, so that an appropriate viscosity is obtained in order to stably discharge ink and to prevent clogging at the distal ends of nozzles. Deionized water (ion exchange water) is appropriate for employment. The appropriate content of water in ink (mass %) is equal to or greater than 30.0 mass % and equal to or smaller than 90.0 mass %, relative to the total mass of ink, as a reference.

(Color Materials)

Color materials used as ink for this invention are not especially limited, so long as the material is water-soluble. A water-soluble dye or pigment can be employed. Relative to the total mass of ink, as a reference, the content of the color material in ink (mass %) can be equal to or greater than 0.1 mass % and equal to or smaller than 15.0 mass %, and more particularly, equal to or greater than 1.0 mass % and equal to or smaller than 10.0 mass %.

(Filling Ink Retention Member with Ink)

A method for filling ink into the ink retention member is not especially limited; however, in this invention, for ink having a dynamic surface tension, a method for injecting ink to cause diffused permeation, from inside the ink retention member can be employed when filling the ink retention member.

(Measuring Dynamic Surface Tensions)

For the thus obtained ink for examples 1 to 10 and comparison examples 1 to 20, the dynamic surface tension for lifetime periods of (1) 50 msec, (2) 500 msec and (3) 5000 msec were measured using an apparatus (BP-D4; produced by Kyowa Interface Science Co., Ltd.) that employs the maximum bubble pressure method.

(Measuring the Interfacial Tension of an Ink Retention Member)

For measuring the interfacial tension of the ink retention member, a wetting tension test liquid mixture (produced by Wako Pure Chemical Industries, Ltd.) was employed. First, using a pipette, one droplet of the wetting tension test liquid mixture was applied in order from smallest surface tension, to a new face of the ink retention member, and the status after the liquid mixture was applied was observed. When a droplet of the liquid mixture did not any longer permeate (was repelled by) the ink retention member, the surface tension at that time was regarded as the interfacial tension of the ink retention member.

The following is a reason that a wetting tension test liquid mixture was employed to measure the interfacial tension. Since the wetting tension test liquid mixture is a liquid for which the surface tension is adjusted using a solvent, not using a surfactant, there is no change in the dynamic surface tension. The "repelled state" of the drop indicates a status wherein immediately wetting occurred after the wetting reagent contacted the holding member. The change in the dynamic surface tension of wetting tension test liquid mixture obtained by using the maximum bubble pressure method is indicated by (4) in FIG. 2.

The interfacial activity of the ink retention member can be properly designated in accordance with a desired performance for the ink tank, and the value measured by the above method should fall within a range of 32 mN/m to 42 mN/m.

EXAMPLES

The present invention will be described more specifically by employing examples and comparison examples; however, without departing from the subject, the present invention is not limited to these examples. In the following description, "part" and "%" are provided based on a mass reference, unless an explanatory note is given.

(Prepare Test Ink)

The individual elements shown in Table 1 were mixed and well agitated, the mixture was filtered using a micro filter (produced by Fuji Film Corp.) having a pore size of 0.2 μm, and test inks 1 to 6 were obtained. Table 1 shows the compositions of test inks 1 to 6. In Table 1, EMULMIN NL80 and EMULMIN L90S are surfactants produced by Sanyo Chemical Industries, Ltd. EMALEX1615 and EMALEX1815 are surfactants produced by Nihon Emulsion, Co., Ltd, and ACETYLENOL E-100 is a surfactant produced by Kawaken Fine Chemicals Co., Ltd.

TABLE 1

| | Ink composition | | | | | | |
|---|---|---|---|---|---|---|---|
| | Ink | | | | | | |
| | 1 | 2 | 3 | 4 | 5 | 6 | 7 |
| DBL 199 | 3 | 3 | 3 | 3 | 3 | 3 | 3 |
| Glycerin | 10 | 10 | 10 | 10 | 10 | 10 | 10 |
| Diethylene glycol | 10 | 10 | 10 | 10 | 10 | 10 | 10 |
| 1,2-hexanediol | | | | | 1.5 | | 1.5 |
| EMALEX 1615 | 1 | | | | | | |
| EMALEX 1815 | | | | | 1.1 | | |
| EMULMIN L90S | | 0.3 | | | | | |
| EMULMIN NL80 | | | | 0.1 | 0.5 | | |
| ACETYLENOL E-100 | | | | | | 0.6 | |
| Ion exchanged water | 76.0 | 76.7 | 76.9 | 76.50 | 74.40 | 76.40 | 75.50 |

Test inks 1 to 6, shown in Table 1, that have different dynamic surface tension changes were prepared. The measurement values of the dynamic surface tensions of these inks 1 to 6 are shown in Table 2.

TABLE 2

| | Dynamic surface tension values [mN/m] | | | | | | |
|---|---|---|---|---|---|---|---|
| | 1 | 2 | 3 | 4 | 5 | 6 | 7 |
| Dynamic surface tension for 50 msec | 48 | 45 | 51 | 39.5 | 48 | 36 | 45 |
| Dynamic surface tension for 500 msec | 35 | 36 | 39 | 34 | 40 | 34 | 45 |
| Dynamic surface tension for 5000 msec | 30 | 33 | 33.5 | 32 | 33 | 34 | 45 |

TABLE 2-continued

| | Dynamic surface tension values [mN/m] | | | | | | |
|---|---|---|---|---|---|---|---|
| | 1 | 2 | 3 | 4 | 5 | 6 | 7 |
| Difference of dynamic surface tensions between for 50 msec and for 5000 msec | 18 | 12 | 17.5 | 7.5 | 15 | 2 | 0 |

(Ink Tank)

An ink retention member using a PP fiber and an ink retention member using urethane were prepared as ink retention members for an ink tank. A standard wetting test reagent was employed to measure the interfacial surfaces of the PP fiber absorbent member and the urethane absorbent member that served as holding members. The interfacial tension of the PP fiber absorbent member was 40 mN/m, while the interfacial tension of the urethane absorbent member was 38 mN/m. These individual holding members, which have different interfacial tensions, were mounted on the black cartridge of FINE cartridge BC-70 for an ink jet printer PIXUS iP2200 (by Canon). In this manner, an ink tank (cartridge) was prepared wherein ink retention members having different interfacial tensions were provided.

(Ink Injection)

First, test ink was used to fill a syringe having a capacity of 50 ml using an 18 G injection needle. The injection needle of this syringe was inserted into the ink tank where ink retention members having different interfacial tensions were stored, and 10 g of ink was injected at a speed of about 3 g a second while the tip of the needle was held at a height of 5 mm from the filter. After ink was injected, suction was performed in order to draw ink to the discharge ports. As a result, an ink tank of an integrated type, with an ink jet recording head, was obtained and used for the evaluation.

(Evaluation)

(1) First Problem

The negative pressure generating member of the ink tank and the dynamic surface tension of the ink were adjusted, and in the following manner, an evaluation was conducted of the reliability with which shock was countered during physical distribution and the efficiency of the ink use. The test inks prepared above were injected into the PP fiber absorbent member whose interface tension, measured using the wetting reagent, was 40 mN/m, and the urethane absorbent member whose interface tension was 38 mN/m, and a shock resistance and an ink leakage test and an ink use efficiency test were performed.

Sets of test inks and ink retention members employed for evaluation are shown in Table 3-1 and Table 3-2.

TABLE 3-1

| | Evaluation ink tank | | | | | | |
|---|---|---|---|---|---|---|---|
| | 1 | 2 | 3 | 4 | 5 | 6 | 7 |
| Test ink | 1 | 2 | 3 | 4 | 5 | 6 | 7 |
| ink retention member material | PP fiber | PP fiber | PP fiber | PP fiber | PP fiber | PP fiber | PP fiber |

TABLE 3-2

| | Evaluation ink tank | | | | | | |
|---|---|---|---|---|---|---|---|
| | 8 | 9 | 10 | 11 | 12 | 13 | 14 |
| Test ink | 1 | 2 | 3 | 4 | 5 | 6 | 7 |
| ink retention member material | Urethane | Urethane | Urethane | Urethane | Urethane | Urethane | Urethane |

<Shock Resistance and Ink Leakage Test>

To examine the leakage of ink upon receiving a shock, a drop test was conducted, i.e., from a height of 50 cm, the entire whole recording head was repetitively dropped onto a wooden plate of 2 cm thickness, with the discharge port face of the recording head directed upward.

<Efficiency of Ink Use)

As the test of the efficiency of ink use, printing was performed by mounting the ink tank, integrated with the ink jet recording head, that was used for the evaluation, on the main body of a printer, and the amount of ink consumed before printing became faded was obtained. As a result, it was confirmed that a larger amount of ink was consumed when the dynamic surface tension of ink, for 5000 msec, was lowered.

The evaluation results for the first problem are shown in Table 4 below, where ○ indicates satisfactory results, x indicates defective, and Δ indicates hard to determine either way.

TABLE 4

| | Evaluation results of the first problem | | | | | | | | | | | | | |
|---|---|---|---|---|---|---|---|---|---|---|---|---|---|---|
| | Evaluation ink tank | | | | | | | | | | | | | |
| | 1 | 2 | 3 | 4 | 5 | 6 | 7 | 8 | 9 | 10 | 11 | 12 | 13 | 14 |
| Shock resistance and ink leakage | ○ | ○ | ○ | x | ○ | x | x | ○ | ○ | ○ | ○ | ○ | x | x |
| Efficiency of use of ink | ○ | ○ | ○ | ○ | ○ | Δ | x | ○ | ○ | ○ | ○ | ○ | Δ | x |

As shown in table 4 for the evaluation results of the first problem, for the set of the ink retention member and ink whose dynamic surface tension for 50 msec was lower than the interfacial tension of the ink retention member, the leakage of ink due to vibration was found. Further, in case for the ink 6, ink that overflowed during the injection of ink and that was not held in the ink retention member, leaked.

The efficiency of ink use appeared to be better for ink for which the dynamic surface tension for 5000 msec was low. Based on these results, both reliability, relative to a shock during physical distribution and the efficiency of ink use were obtained for ink for which the dynamic surface tension for a lifetime of 50 msec was higher than the ink retention member, and within a lifetime of 5000 msec, became lower than the ink retention member. Further, more satisfactory results were obtained when a difference in dynamic surface tensions for 50 msec and for 5000 msec was 8 mN/m.

When the dynamic surface tension of test ink 4 was measured using a BP2 bubble pressure dynamic surface tension meter (produced by Kruss GmbH), 45.0 mN/m and 33 mN/m were obtained for 10 msec and for 1000 msec, respectively. The dynamic surface tension of ink 4 for 10 msec was greater than those for the PP absorbent fiber member and the urethane absorbent member that server as the ink retention member; however, leakage of ink from the PP fiber absorbent member was found. Based on this fact, it was confirmed that in order to obtain an effective ink holding property relative to an external shock, such as vibration, the dynamic surface tension for 50 msec should be greater than the interfacial tension of the ink retention member.

(2) Second Problem

A second objective of the present invention is the provision of an innovative ink tank that can greatly simplify the injection of ink, and/or improve the distribution state of ink that has been injected. The sets of the test inks and the ink retention members shown in Table 3-1 and Table 3-2 were employed, and the individual inks were injected under the ink injection condition. The process for filling the ink tanks with the inks were observed, and whether the simplicity of ink injection and the distribution of the injected ink were improved was evaluated.

First, through observation of the process for filling the ink tank with ink, injection of ink for all the evaluation ink tanks 1 to 14 was performed with no problem.

After ink was injected, the ink retention members were extracted from the ink tanks and were cut, and the state in which ink was held was observed for the individual ink retention members. When the ink retention members were extracted from the evaluation ink tanks 7 and 14, for which the dynamic surface tension of ink for 5000 msec is higher than the interfacial tension of the ink retention member, it was found that some ink that could not be held by the ink retention member and overflowed therefrom remained in the tank, and that ink was not fully absorbed by the ink retention member.

Further, when the ink retention members were extracted from the evaluation ink tanks 4, 6 and 13, for which the dynamic surface tension of ink for 50 msec is lower than the interfacial tension of the ink retention members, the ink was held by the ink retention members without overflowing. However, when the ink retention members were cut and their cross sections were observed, the liquid surfaces of ink in cross sections of the absorbent members were not uniform along the shapes of the absorbent members. Further, in the absorbent members, ink was locally present even at a position apart from the vicinity of the filters where ink should be present. This is probably because, before injected ink was held in place, the ink migrated along the variance in the ink retention member, or along the wall face of the ink tank.

The observation was performed in the same manner as for the evaluation ink tanks 1, 2, 3, 8, 9 and 10, for which the dynamic surface tension of ink for 50 msec was higher than the interfacial tension of the ink retention member, and within 500 msec, was reduced to below the interfacial tension of the ink retention member. That is, when the ink retention members were extracted from these ink tanks, the inks were held in the ink retention members without overflowing. Further, when the ink retention members were cut and their cross sections were observed, the liquid surface of ink in the cross section showed a uniform ink distribution in which ink was collected near the filter to form a spherical shape, with the needle tip as the center. Further, for the evaluation ink tanks 5, 10 and 12, for which the dynamic surface tension of ink for 50 msec was higher than the interfacial tension of the ink retention member, and in 500 msec or later, became lower than the interfacial tension of the ink retention member, the liquid surface of ink in cross section also formed a uniform distribution state. However, compared with the evaluation ink tanks 1, 2, 3, 8, 9 and 10 for which, within 500 msec, the dynamic surface tension became lower than the interface tension of the ink retention member, it was found that the presence of ink was slightly localized.

Based on these results, it was confirmed that ideal ink filling can be performed by employing ink for which the dynamic surface tension for 50 msec was greater than the interfacial tension of the ink retention member, and that within 5000 msec, became lower than the interfacial tension of the ink retention member.

(3) Third Problem

The third problem is a problem for an ink tank integrated with an ink jet head. That is, even when shock occurred upon the mounting of an ink jet head on a carriage or on the mounting portion of a printer, a very reliable unit of an integrated head and tank that prevents the dripping of ink at the discharge port is provided. As a result, the reliability is improved.

For an evaluation of the third problem, integrated head and tank units were prepared that employed the sets of test inks and ink retention members shown in Table 3-1 and 3-2, which were prepared for the evaluation of the first problem. The main body of a printer, from which the suction operation was removed, was employed to repeat the head mounting and removing operation, and thereafter, the test of shock resistance upon the mounting/removing of the head was conducted by employing a nozzle check pattern incorporated in the printer. As a result, during the head mounting/removing test, the nozzle check pattern could be printed without any problem, except for the evaluation ink tanks 4, 6 and 13, for which the dynamic surface tension for 50 msec is lower than the interfacial tension of the ink retention member.

A second objective of the present invention is the provision of an innovative ink tank that can greatly simplify the injection of ink, and/or improve the distribution state of ink that has been injected. A third problem to be solved by the present invention is the provision of a unit wherein an ink tank is integrally formed with an ink jet head, that provides superior reliability, even if shocks occur when the ink jet head is mounted on a carriage or on a mounting portion for a printer, without causing any accompanying leakage of ink.

A second aspect of the present invention especially resolves the second problem, and provides an ink jet recording ink tank comprising:

an ink retention member, which to hold ink exerts a negative pressure through capillary force; and ink, which undergoes a dynamic surface tension change, and for which surface tension in a lifetime of 50 msec, obtained by a maximum bubble pressure method, is higher than an interfacial surface tension of the ink retention member, and within a lifetime of 5000 msec, becomes lower than the interfacial surface tension of the ink retention member.

A third aspect of the present invention includes a condition for performing the second aspect of the invention more effectively, and provides an ink jet recording ink tank, wherein a lifetime of within 500 msec is a period according to the maximum pressure method in which the surface tension of ink becomes lower than the interfacial tension of the ink retention member.

According to a fourth aspect of the present invention, for the ink jet recording ink tank of one of the above described aspects, ink that undergoes a dynamic surface tension change is filled in the ink retention member through the diffused-permeation injection of ink, from inside the ink retention member.

A fifth aspect of the present invention mainly resolves the third problem, and provides an ink tank integrated with an ink jet recording head, obtained by integrally forming an ink jet recording head with an ink tank, as described for the relative aspect.

The first aspect of the invention resolves not only the first but also the third problems, the second aspect of the invention especially resolves the second problem, and the third aspect more appropriately resolves the second problem. Further, an ink tank, or an ink jet recording head integrated ink tank (fourth aspect), can be provided, for which the ink use efficiency is high, without ink leakage due to mechanical shock. The present invention was first provided while focusing on a capillary force that occurs, over a short period of time, between ink and the negative pressure generating member, and to counter the effects of shock occurring during physical distribution and upon the mounting of a head, and of capillary force change continuing for an extended period of time while ink is being used. Therefore, according to this invention, when the dynamic surface tension of ink is adjusted, the effects of shock during physical distribution can be reliably countered and the efficient use of ink can be thoroughly improved. In addition, printing failures that occur upon the mounting of an ink tank of an integrated ink jet recording head type can also be reduced. Moreover, the improvement provided for the injection of ink into the ink tank is particularly superior.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-126894, filed May 11, 2007, which is hereby incorporated by reference herein in its entirety.

What is claimed is:

1. An ink jet recording ink tank comprising:
   an ink retention member, which to hold ink exerts a negative pressure through capillary force; and
   ink, which is retained in the ink retention member, for which a dynamic surface tension in a lifetime of 50 msec, obtained by a maximum bubble pressure method, is higher than an interfacial tension of the ink retention member, a dynamic surface tension in a lifetime of 5000 msec is lower than the interfacial tension of the ink retention member, and a difference between the dynamic surface tension in the lifetime of 50 msec and the dynamic surface tension in the lifetime of 5000 msec is equal to or greater than 8 mN/m.

2. An ink jet recording ink tank according to claim 1, wherein the ink that undergoes the dynamic surface tension change is filled in the ink retention member through diffused-permeation injection, from inside the ink retention member.

3. An ink tank of ink jet recording head integral type, obtained by integrally forming an ink jet recording head with the ink tank, wherein the ink tank is an ink jet recording ink tank according to claim 1.

4. An ink jet recording ink tank comprising:
an ink retention member, which to hold ink exerts a negative pressure through capillary force; and
ink, which undergoes a dynamic surface tension change, and for which a surface tension in a lifetime of 50 msec, obtained by a maximum bubble pressure method, is higher than an interfacial surface tension of the ink retention member, and within a lifetime of 5000 msec, becomes lower than the interfacial surface tension of the ink retention member.

5. An ink jet recording ink tank according to claim 2, wherein a lifetime of within 500 msec is a period according to the maximum pressure method in which the surface tension of ink becomes lower than the interfacial tension of the ink retention member.

6. An ink jet recording ink tank according to claim 2, wherein the ink that undergoes the dynamic surface tension change is filled in the ink retention member through diffused-permeation injection, from inside the ink retention member.

7. An ink tank of ink jet recording head integral type, obtained by integrally forming an ink jet recording head with the ink tank, wherein the ink tank is an ink jet recording ink tank according to claim 4.

* * * * *